US012567787B2

(12) United States Patent
Luo et al.

(10) Patent No.: US 12,567,787 B2
(45) Date of Patent: Mar. 3, 2026

(54) ELECTRIC MOTOR ROTOR INCLUDING END RING RESTRAINER

(71) Applicant: Schaeffler Technologies AG & Co. KG, Herzogenaurach (DE)

(72) Inventors: Tuo Luo, Copley, OH (US); Wasi Uddin, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 264 days.

(21) Appl. No.: 18/216,324

(22) Filed: Jun. 29, 2023

(65) Prior Publication Data
US 2025/0007373 A1 Jan. 2, 2025

(51) Int. Cl.
*H02K 17/16* (2006.01)
*H02K 15/02* (2025.01)
*H02K 15/023* (2025.01)
*H02K 15/165* (2025.01)

(52) U.S. Cl.
CPC ............. *H02K 17/16* (2013.01); *H02K 15/02* (2013.01); *H02K 15/023* (2025.01); *H02K 15/165* (2013.01); *H02K 17/168* (2023.05)

(58) Field of Classification Search
CPC .. H02K 15/023; H02K 15/165; H02K 15/168; B22D 19/0054
See application file for complete search history.

(56) References Cited

U.S. PATENT DOCUMENTS

| | | | | | |
|---|---|---|---|---|---|
| 2,767,340 | A | * | 10/1956 | Martiny | H02K 17/168 310/212 |
| 2,900,537 | A | * | 8/1959 | Morse | H02K 3/16 310/211 |
| 3,262,000 | A | * | 7/1966 | Rediger | H02K 15/023 310/216.013 |
| 3,517,238 | A | * | 6/1970 | Lake | H02K 3/02 29/598 |
| 4,490,638 | A | * | 12/1984 | Lind | H02K 3/20 310/216.115 |
| 5,185,918 | A | * | 2/1993 | Shafer, Jr. | H02K 15/023 29/598 |

(Continued)

FOREIGN PATENT DOCUMENTS

| | | | | | |
|---|---|---|---|---|---|
| CN | 108494133 | A | * | 9/2018 | H02K 1/28 |
| CN | 115360882 | A | * | 11/2022 | H02K 15/023 |

(Continued)

*Primary Examiner* — Oluseye Iwarere
*Assistant Examiner* — Daniel K Schlak
(74) *Attorney, Agent, or Firm* — Davidson Kappel LLC

(57) ABSTRACT

An induction motor rotor includes a magnetic metal core; and an electrically conductive metal contiguous with the magnetic metal core. The electrically conductive metal includes rotor bars extending along the magnetic metal core and end segments formed onto opposite ends of the rotor bars. Each of the end segments includes a base section extending a first axial distance from the magnetic metal core and a protrusion extending a second axial distance from the magnetic metal core. The second axial distance is greater than the first axial distance. The induction motor rotor also includes a metal ring positioned on an outer circumferential surface of each of the end segments to prevent the end segments from separating from the rotor bars.

20 Claims, 8 Drawing Sheets

(56) References Cited

U.S. PATENT DOCUMENTS

| | | | | |
|---|---|---|---|---|
| 5,952,764 A * | 9/1999 | Nakamura | H02K 15/023 | |
| | | | 310/211 | |
| 8,572,837 B2 | 11/2013 | Lyons et al. | | |
| 2005/0017597 A1* | 1/2005 | Mays | H02K 17/168 | |
| | | | 310/211 | |
| 2007/0290569 A1* | 12/2007 | Bode | H02K 15/023 | |
| | | | 29/598 | |
| 2008/0185934 A1* | 8/2008 | Verhoeven | H02K 17/16 | |
| | | | 310/211 | |
| 2009/0033170 A1* | 2/2009 | Jakobi | H02K 17/168 | |
| | | | 29/598 | |
| 2010/0171387 A1* | 7/2010 | Czebiniak | H02K 1/26 | |
| | | | 29/598 | |
| 2011/0074240 A1* | 3/2011 | Hiramatsu | H02K 15/023 | |
| | | | 29/598 | |
| 2013/0033144 A1* | 2/2013 | Alfermann | H02K 15/023 | |
| | | | 310/211 | |
| 2013/0154430 A1* | 6/2013 | Dragon | H02K 15/023 | |
| | | | 310/211 | |
| 2013/0193811 A1* | 8/2013 | Chamberlin | H02K 15/023 | |
| | | | 310/216.116 | |
| 2014/0368082 A1* | 12/2014 | Barton | H02K 15/165 | |
| | | | 29/598 | |
| 2015/0349616 A1* | 12/2015 | Büttner | H02K 15/023 | |
| | | | 29/598 | |
| 2016/0211731 A1* | 7/2016 | Mayer | H02K 19/04 | |
| 2017/0054351 A1* | 2/2017 | Ishikawa | H02K 1/12 | |
| 2017/0237323 A1 | 8/2017 | Lyons et al. | | |
| 2018/0041103 A1* | 2/2018 | Xiao | H02K 17/20 | |
| 2018/0278106 A1* | 9/2018 | Moriya | H02K 1/30 | |
| 2018/0301966 A1* | 10/2018 | Weber | H02K 17/20 | |
| 2021/0184551 A1* | 6/2021 | Galmiche | H02K 1/28 | |
| 2021/0376675 A1* | 12/2021 | Futatsugi | H02K 15/02 | |
| 2023/0142750 A1* | 5/2023 | Büttner | H02K 15/023 | |
| | | | 310/211 | |

FOREIGN PATENT DOCUMENTS

| | | | | |
|---|---|---|---|---|
| DE | 19729432 C1 * | 1/1999 | | H02K 17/20 |
| WO | WO-2020115462 A1 * | 6/2020 | | H02K 15/023 |

* cited by examiner

ELECTRIC MOTOR ROTOR INCLUDING END RING RESTRAINER

TECHNICAL FIELD

The present disclosure relates generally to induction motors, and more specifically to induction motor rotors in motor vehicles.

BACKGROUND

Induction motor rotors can include aluminum rotor bars and end segments.

SUMMARY

An induction motor rotor includes a magnetic metal core; and an electrically conductive metal contiguous with the magnetic metal core. The electrically conductive metal includes rotor bars extending along the magnetic metal core and end segments formed onto opposite ends of the rotor bars. Each of the end segments includes a base section extending a first axial distance from the magnetic metal core and a protrusion extending a second axial distance from the magnetic metal core. The second axial distance is greater than the first axial distance. The induction motor rotor also includes a metal ring positioned on an outer circumferential surface of each of the end segments to prevent the end segments from separating from the rotor bars.

In examples, the electrically conductive metal includes at least 99% aluminum.

In examples, the induction motor rotor is a squirrel cage rotor.

In examples, at least on the protrusions includes at least one axially extending balancing hole formed therein.

In examples, the outer circumferential surface of each of the end segments includes a shoulder, each of the metal rings abutting a respective one of the shoulders.

In examples, the metal ring is non-magnetic.

In examples, the magnetic metal core includes a plurality of circumferentially spaced axially extending holes, the rotor bars being cast into the circumferentially spaced axially extending holes.

In examples, the metal rings are each on an outer circumferential surface of a respective one of the protrusions.

In examples, a portion of each of the end segments extends radially inward of the rotor bars.

In examples, the portion of each of the end segments extending radially inward of the rotor bars is part of the base section.

In examples, the metal rings are formed of non-magnetic steel.

In examples, the metal rings have a higher yield strength than the end segments.

An induction motor is also provided including a stator and a rotor rotatable with respect to the stator. The rotor includes a magnetic metal core formed by a plurality of circumferentially spaced segments, and an electrically conductive metal including rotor bars interleaved between the circumferentially spaced segments and end segments formed onto opposite ends of the rotor bars. Each of the end segments protrudes axially past the magnetic metal core and includes a base section extending a first axial distance from the magnetic metal core and a protrusion extending a second axial distance from the magnetic metal core. The second axial distance being greater than the first axial distance. The induction motor also includes a metal ring positioned on an outer circumferential surface of each of the end segments. The metal ring has a greater yield strength than the end segments.

A method of manufacturing an induction motor rotor is also provided including joining an electrically conductive metal to a magnetic metal core to form rotor bars interleaved between circumferentially spaced segments of the magnetic metal core and end segments formed onto opposite ends of the rotor bars. Each of the end segments protrudes axially past the magnetic metal core and including a base section extending a first axial distance from the magnetic metal core and a protrusion extending a second axial distance from the magnetic metal core, the second axial distance being greater than the first axial distance. The method also includes fixing a metal ring on an outer circumferential surface of each of the end segments. The metal rings each have a greater yield strength than the end segments.

In examples, the joining of the electrically conductive metal to the magnetic metal core includes: positioning a plurality of magnetic segments circumferentially spaced apart from each other into a mold; and casting an electrically conductive metal into mold to form rotor bars interleaved between the circumferentially spaced segments and end segments formed onto opposite ends of the rotor bars.

In examples, the method further includes machining an annular surface on the outer circumferential surface of each of the end segments, and the metal rings are each fixed on one of the annular surfaces.

In examples, the method further includes machining balancing holes into the protrusion to balance the rotor.

In examples, the fixing of the metal rings on the outer circumferential surface of end segments includes shrink-fitting each of the metal rings on a respective one of the end segments.

BRIEF DESCRIPTION OF THE DRAWINGS

The present disclosure is described below by reference to the following drawings, in which.

DETAILED DESCRIPTION

Figure 1:
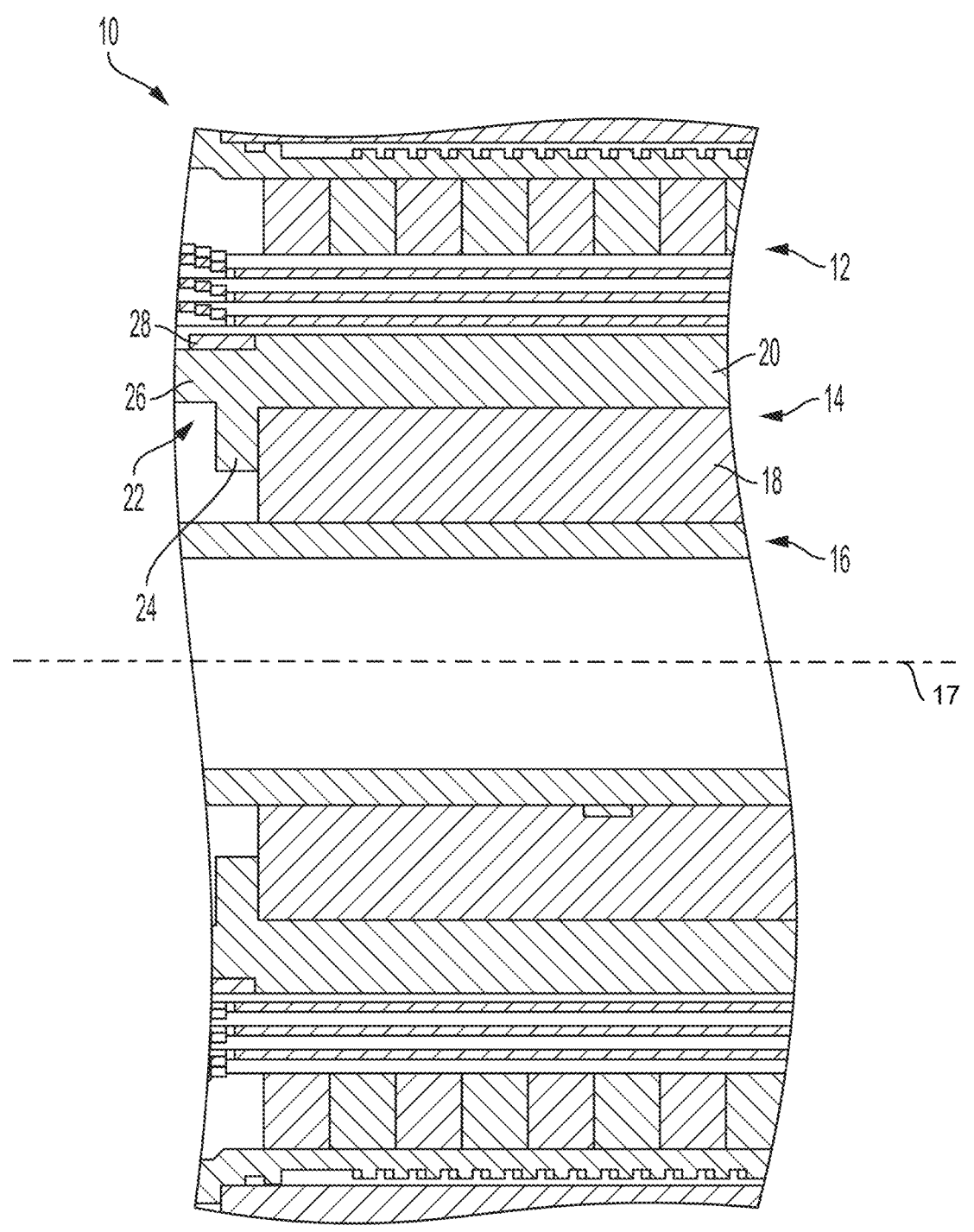
FIG. 1 shows a cross-sectional radially facing view of an induction motor in accordance with the present disclosure.

FIG. 1 shows a cross-sectional radially facing view of an induction motor 10 including a stator 12 and a rotor 14 rotatable with respect to the stator 12. Rotor 14 is non-rotatably fixed to a rotor shaft 16, with rotor 14 and rotor shaft 16 being rotatable together within stator 12 about a center axis 17 in a known manner. Unless otherwise specified, the terms axial, radial, circumferential and derivatives thereof refer to center axis 17. The rotor 14 is a squirrel cage rotor and includes a magnetic metal core 18 and an electrically conductive metal 19 that includes rotor bars 20 and end segments 22. Rotor bars 20 extend along the magnetic metal core 18 and end segments 22 are formed onto opposite ends of the rotor bars 20.

Rotor bars 20 are electrically conductive and provide a path for the flow of current within rotor 14. Rotor bars 20 are shorted at the ends by end segments 22, forming a closed loop. When the motor 10 is energized, a magnetic field of the stator 12 induces an electric current in the rotor bars 20. Magnetic metal core 18 provides a path for the magnetic flux generated by windings of stator by channeling the magnetic field produced by the stator 12 to the rotor bars 20. As discussed further below, electrically conductive metal 19 is contiguous with the electric metal core 18 and electrically conductive metal 19 can be joined with magnetic metal core 18 by casting to formed rotor bars 20 and end segments 22.

Each of the end segments 22 includes a base section 24 extending a first axial distance from the magnetic metal core 18 and a protrusion 26 extending a second axial distance from the magnetic metal core 18, with the second axial distance being greater than the first axial distance. A metal ring 28 is positioned on an outer circumferential surface of each of the end segments 22 to prevent the end segments 22 from separating from the rotor bars 20 as rotor 14 rotates about center axis 17.

Protrusions 26, which have an annular shape, are provided for balancing rotor 14 during production and assembly of motor 10. In particular, protrusions 26 provide extra mass that can be machined to form balancing holes 30 that balance rotor 14. Protrusions 26 can also achieve lower end segment 22 power loss due to electric resistance in order to reduce the thermal loading into motor 10, in comparison to end segments without protrusions. However, as electrically conductive metal 19 is formed of a material having a relatively low yield strength, end segments 22 with protrusions 26 can separate from rotor bars 20 during operation of rotor 14 at high RPM loading in the absence of metal rings 28. Metal rings 28, which are made of a metal having a higher yield strength than that of the material of electrically conductive metal 19, prevent end segments 22 from separating from rotor bars 20.

In examples, the electrically conductive metal 19 can be aluminum. In particular, the electrically conductive metal 19 can include at least 99% of aluminum. An example aluminum alloy is Al alloy 1XXX.

The metal ring 28 can be made out of a non-magnetic material having a higher yield strength than the end segments 22. Forming ring 28 from a non-magnetic metal eliminates the possibility of Eddy current production in the ring 28, such that there is no loss due to Eddy current. Magnetic metal core 18 can for example be formed of steel laminations.

The mechanical strength of electrically conductive metal 19 is limited, ductile but softer than the magnetic metal core 18. For example, the electrically conductive metal 19 including at least 99% of aluminum has yield strength of 30-50 MPa and UTS below 100 MPa with plastic fracture limit of 30%-60%. The mechanical strength of end segments 22 including protrusions 26 is usually the weakest point under high RPM loading, and adding metal ring 28 provides sufficient mechanical strength. Metal ring 28 can be formed of a material having a yield strength can be from 400-1000

MPa, and a yield strength ratio of the material of metal ring 28 is 10 to 25 times that of the material of electrically conductive metal 19.

Figure 2:
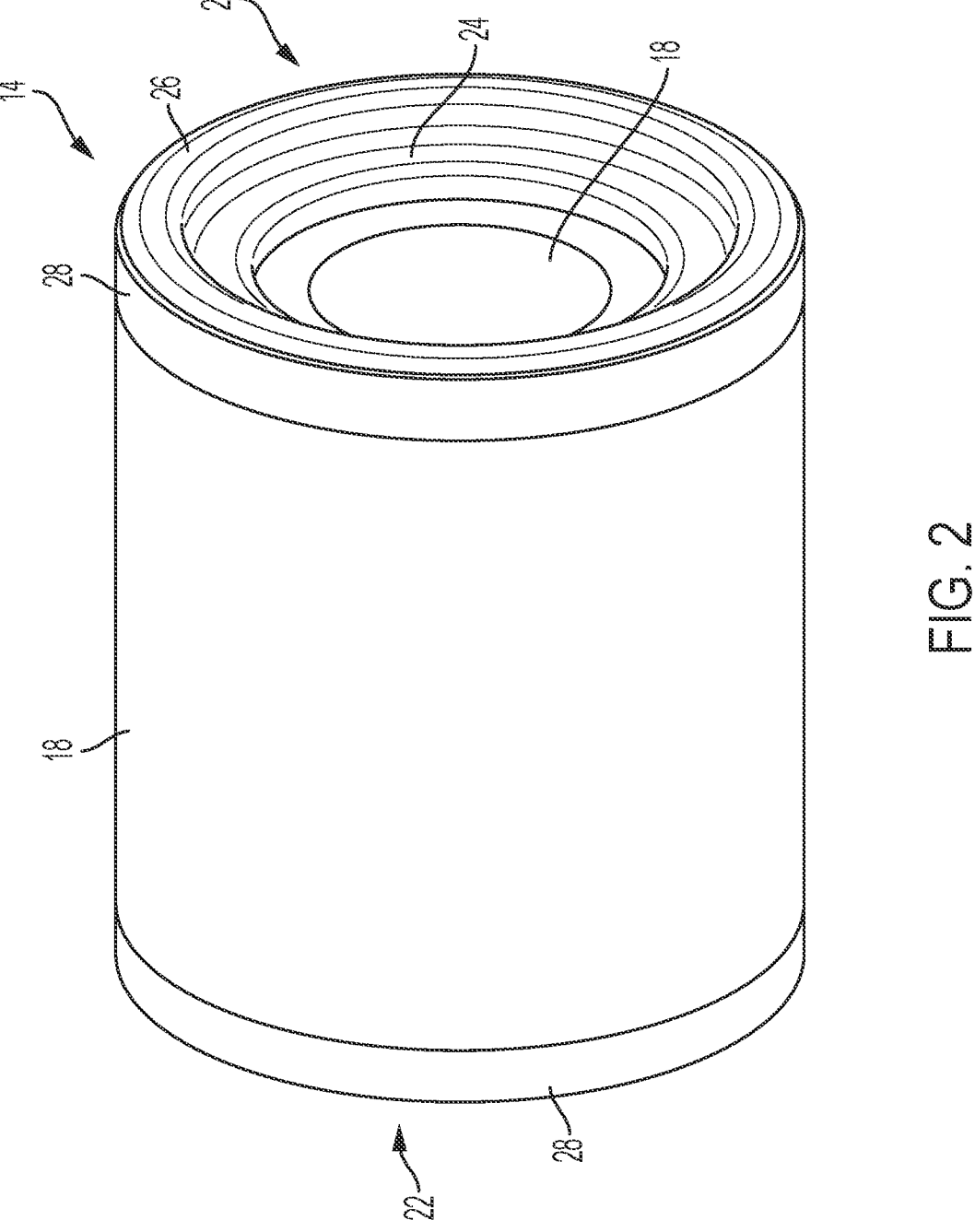
FIG. 2 shows a standalone view of a rotor of the induction motor, illustrating a hollow cylindrical shape of the rotor.
Figure 3:
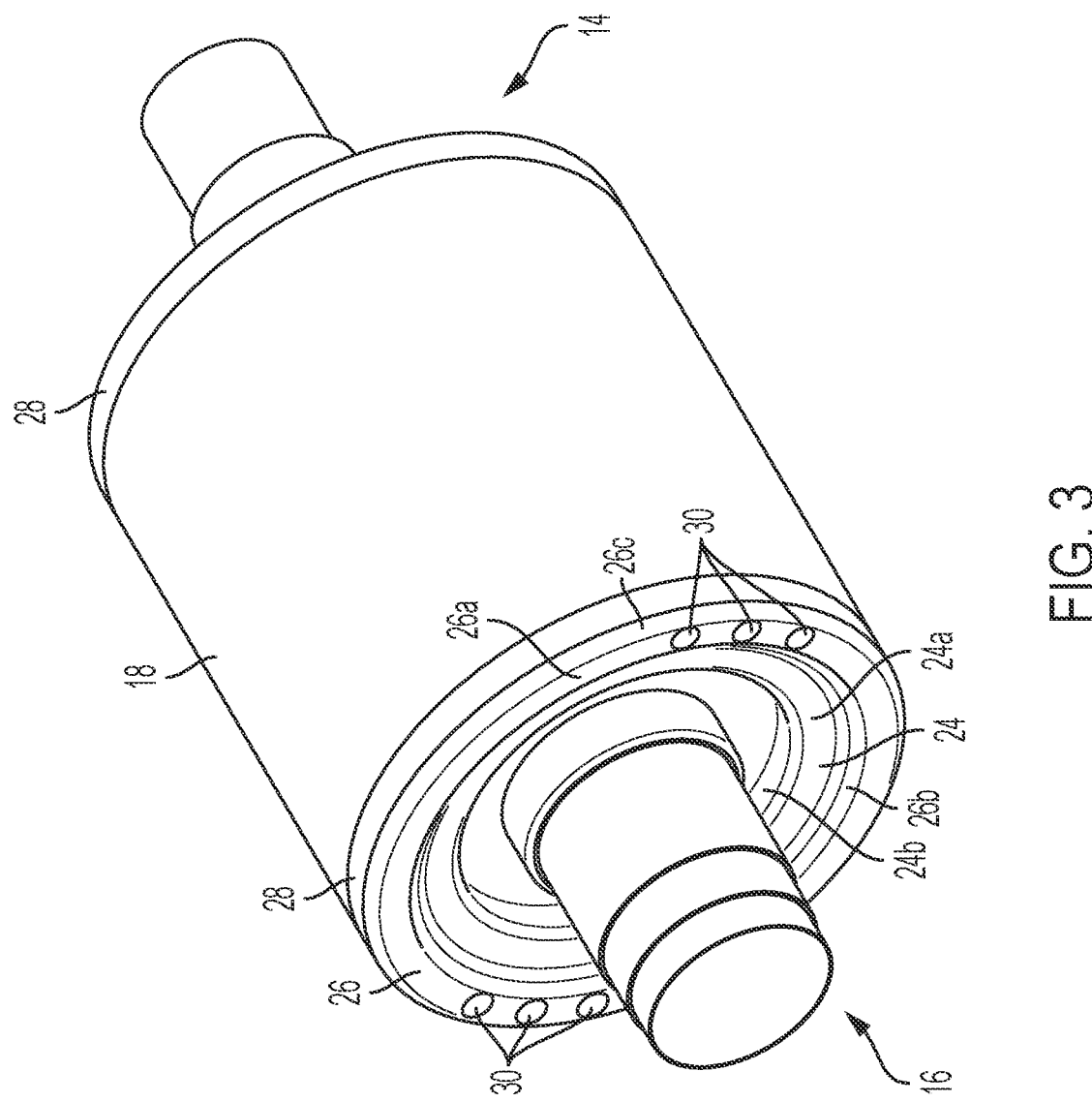
FIG. 3 shows the rotor provided on a rotor shaft with a plurality of balancing holes being formed axially into one of the protrusions.

FIGS. 2 and 3 show perspective views of the rotor 14 illustrating the three-dimensionality of rotor 14, and the annular shape of end segments 22.

FIG. 2 shows a standalone view of rotor 14, illustrating the hollow cylindrical shape of rotor 14. Rings 28 are provided on the outer circumferential surface of the annular protrusion 26 of each of end segments 22.

FIG. 3 shows rotor 14 provided on rotor shaft 16 with a plurality of balancing holes 30 being formed axially into one of the protrusions 26. Six balancing holes 30 are shown in FIG. 3, with three holes 30 being formed on a first half of the protrusion 26 and three holes 30 being formed on a second half of the protrusion 26.

The balancing holes 30 are machined after a rotational assembly including shaft 16 and rotor 14 is assembled. An imbalance of the rotational assembly is measured, and balancing holes 30 are drilled into protrusions 26 by machining the material off from the second half of the protrusion 26. Based on the imbalance measure, zero to eight balancing holes 30 can be machined into each axial end concentrated into a quarter section with a spacing of ~2.5 mm between the edge of holes 30. Balancing holes 30 can be provided on one or both axial ends. For example, if the only imbalance mass is on one axial end, then one or more holes 30 can be drilled on that end at a location that mitigate the effect of the imbalance.

Balancing holes 30 are formed axially into an axially facing radially extending surface 26a of protrusion 26. Surface 26a faces away from magnetic metal core 18 and extends from an inner circumferential surface 26b of protrusion 26 to an outer circumferential surface 26c of the protrusion 26. Base sections 24 also each have an annular shape and include an axially facing radially extending surface 24a that is provided radially inward of inner circumferential surface 26b of protrusion, and inner circumferential surface 24b that is radially inward from axially facing radially extending surface 24a.

Figure 4:
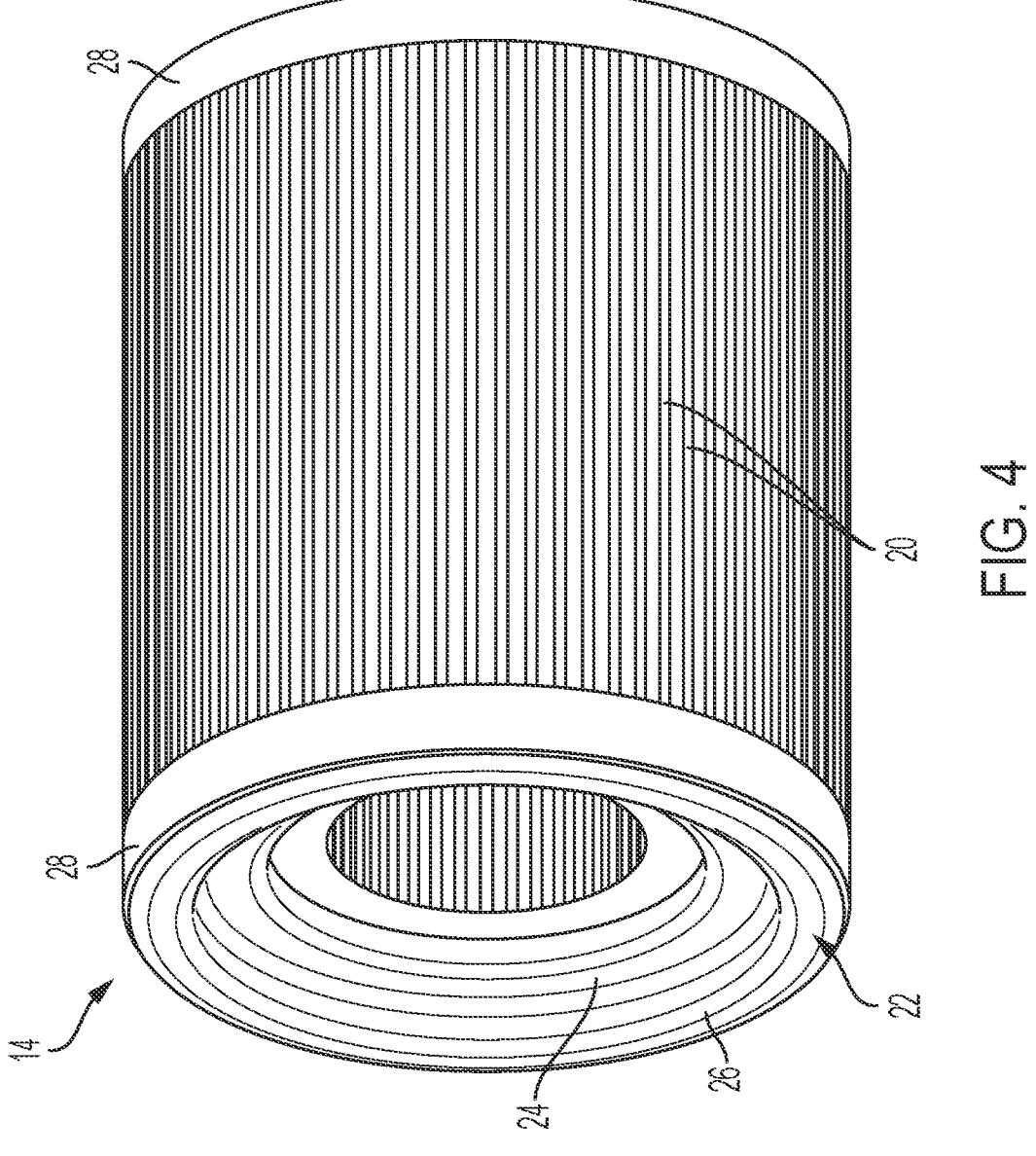
FIG. 4 shows a perspective view of the rotor, with a magnetic metal core of the rotor being transparent to illustrate rotor bars.
Figure 5:
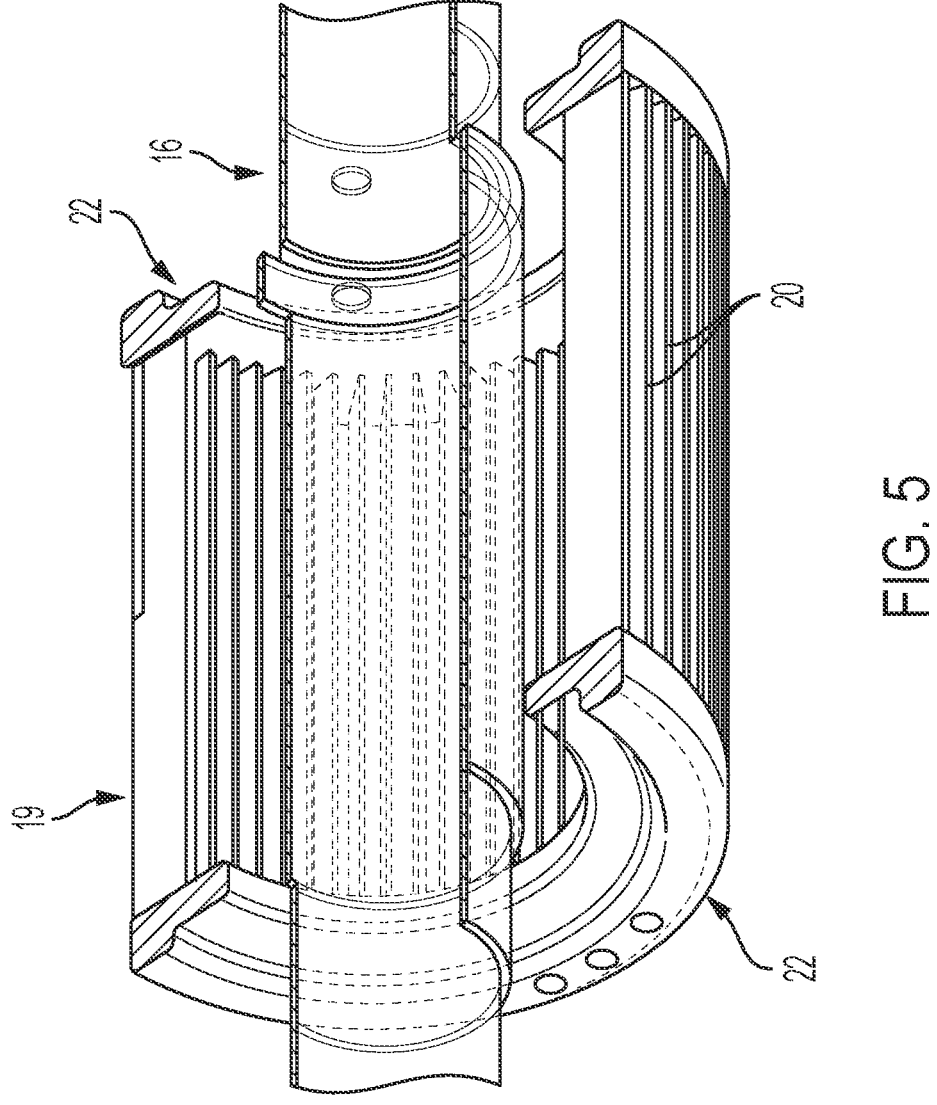
FIG. 5 shows a cross-sectional perspective standalone view of electrically conductive metal of the rotor and the rotor shaft.

FIG. 4 shows a perspective view of the rotor 14, with magnetic metal core 18 being transparent in FIG. 4 in order to illustrate rotor bars 20, and FIG. 5 shows a cross-sectional perspective standalone view of electrically conductive metal 19 and rotor shaft 16. Rotor bars 20 are circumferentially spaced from each other at equidistant circumferential intervals and each rotor bar 20 extends from one end segment 22 to the other end segment 22.

Figure 6:
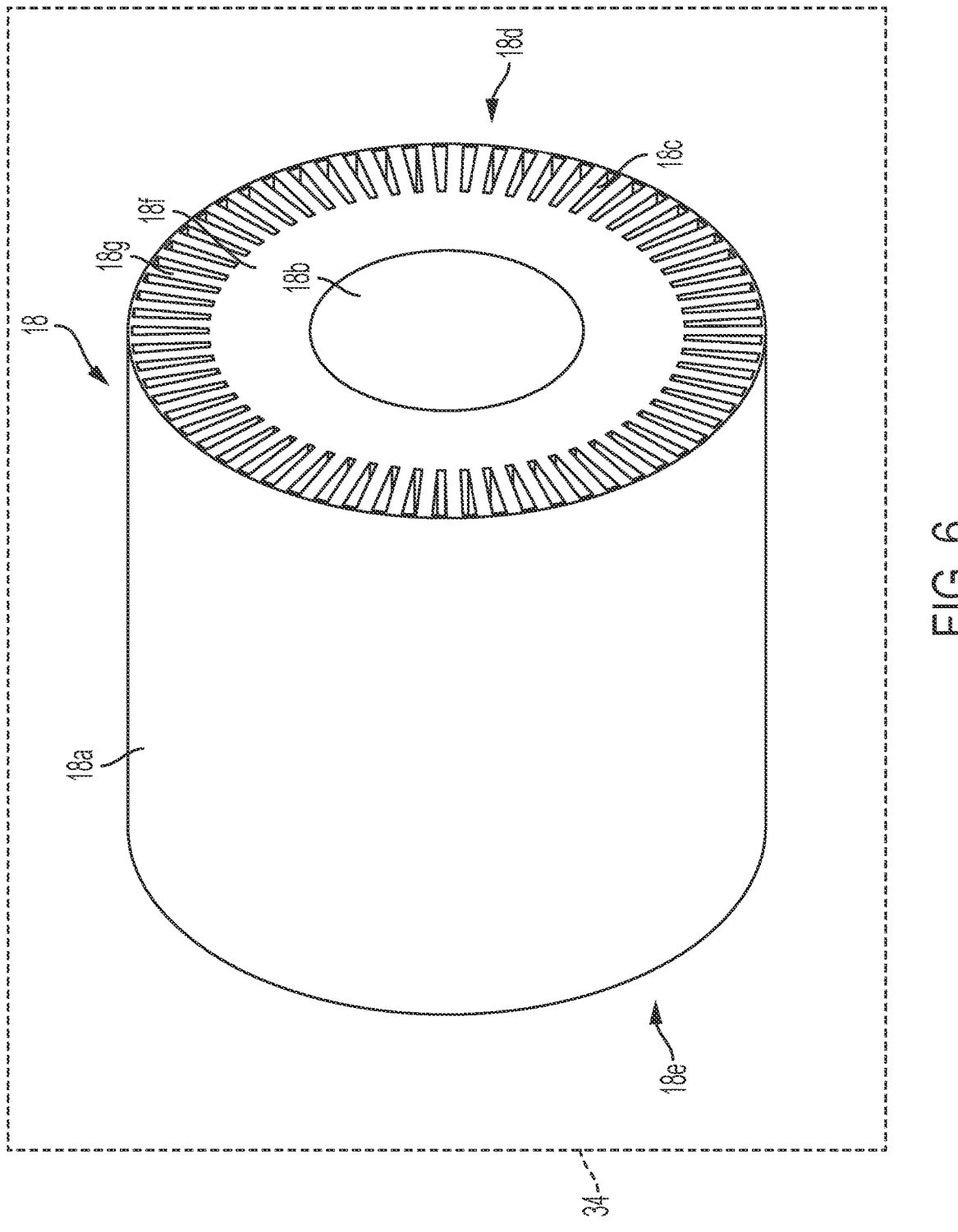
FIG. 6 shows a perspective standalone view of the magnetic metal core.

FIG. 6 shows a perspective standalone view of the magnetic metal core 18. Magnetic metal core 18 includes an outer circumferential surface 18a, which can form an outer circumferential surface of rotor 14, and an inner circumferential surface 18b, which can form an inner circumferential surface of rotor 14. A plurality of circumferentially spaced axially extending holes 18c extend axially from a first axial end 18d of magnetic metal core 18 to a second axial end 18e of magnetic metal core 18. Each of ends 18d, 18d is defined by a respective axially extending surface 18f, and holes 18c extending through both surfaces 18f. Holes 18c are circumferentially separated from each other by a plurality of circumferentially spaced radially extending segments 18g.

Figure 7:
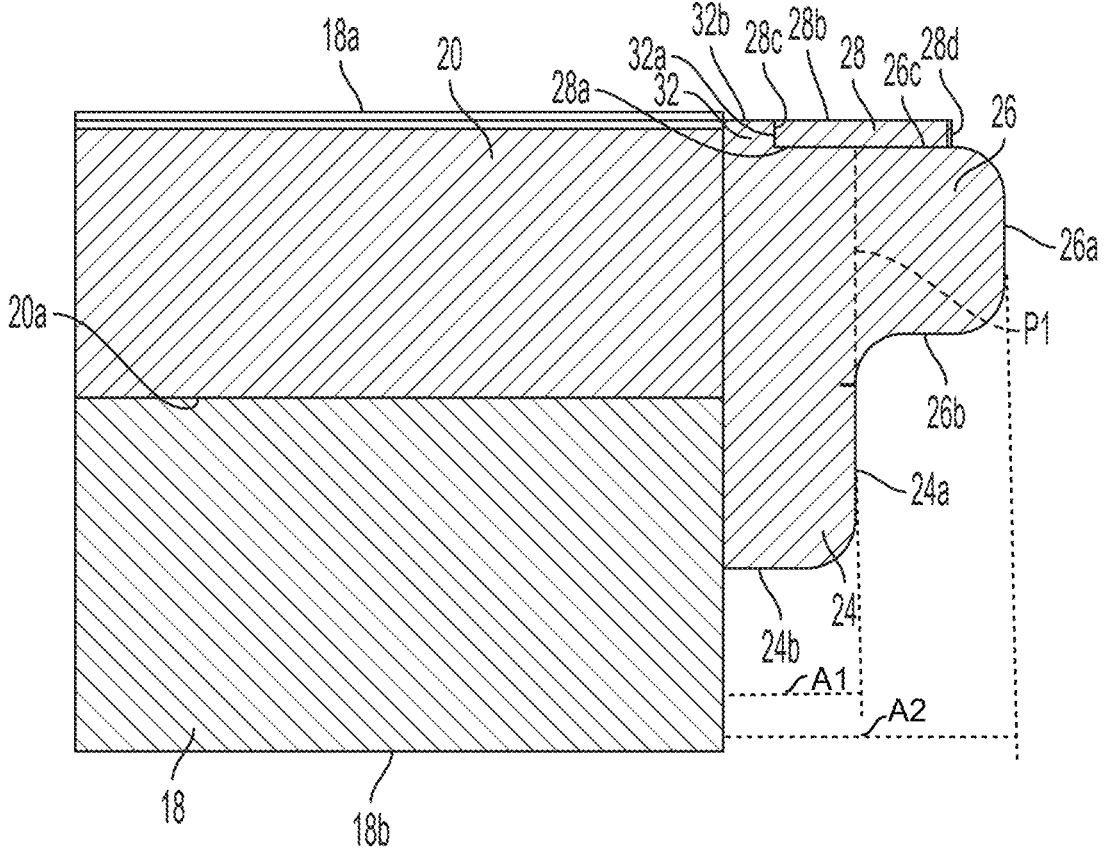
FIG. 7 shows a circumferentially facing cross-sectional view of a section of one axial end of the rotor.

FIG. 7 shows a circumferentially facing cross-sectional view of a section of one axial end of rotor 14. As discussed above, the end segments 22 are formed onto opposite axial ends of the rotor bars 20, and each of the end segments 22 protrudes axially past the magnetic metal core 18. Each segment 22 includes the base section 24 extending a first axial distance A1 from the magnetic metal core 18 and the protrusion 26 extending a second axial distance A2 from the magnetic metal core 18. In particular, an axial edge of base section 24 defines a radially extending plane P1, and protrusion 26 extends past radially extending plane P1.

Outer circumferential surface 26c of end segment 22 has a stepped configuration such that a shoulder 32 is provided on outer circumferential surface 26c. Metal ring 28 includes an inner circumferential surface 28a, an outer circumferential surface 28b and two axially facing radially extending surfaces 28c, 28d extending radially outward from inner circumferential surface 28a to outer circumferential surface 28b. Inner circumferential surface 28a of metal ring 28 contacts outer circumferential surface 26c and surface 28c axially abuts a radially extending surface 32a of shoulder 32. An outer circumferential surface 32b of shoulder 32 is positioned further radially outward than outer circumferential surface 26c.

The outer circumferential surface 18a of magnetic metal core 18 is positioned at a same radial distance from center axis 17 (FIG. 1) as outer circumferential surface 32b of shoulder 32 and as outer circumferential surface 28b of metal ring 28.

Metal ring 28 is positioned on a portion of outer circumferential surface 26c of base section 24 and a portion of outer circumferential surface 26c of protrusion 26. Segments 22 are positioned with respect to rotor bars 20 such a portion of each end segments 22 extends radially inward past the inner circumferential surfaces 20a of rotor bars 20. In particular, a portion of base section 24 extends radially inward of inner circumferential surfaces 20a of rotor bars 20 and axially facing radially extending surface 26a of protrusion 26 is further radially outward than inner circumferential surfaces 20a of rotor bars 20.

A method of manufacturing induction motor rotor 10 includes joining electrically conductive metal to a magnetic metal core 18 to form rotor bars 20 interleaved between circumferentially spaced segments 18g of the magnetic metal core 18, and end segments 22 formed onto opposite ends of the rotor bars 20. The method also includes fixing the metal ring 28 on the outer circumferential surface 26a of each of the end segments 22. As noted above, the metal rings 28 each have a greater yield strength than the end segments 22.

The joining of the electrically conductive metal 19 to the magnetic metal core 18 can includes positioning a plurality of magnetic segments circumferentially spaced apart from each other into a mold 34 (shown schematically in FIG. 6), and then casting an electrically conductive metal into mold 34 to form rotor bars 20 interleaved between the circumferentially spaced segments 18g and end segments 22 formed onto opposite ends of the rotor bars 20.

Figure 8:
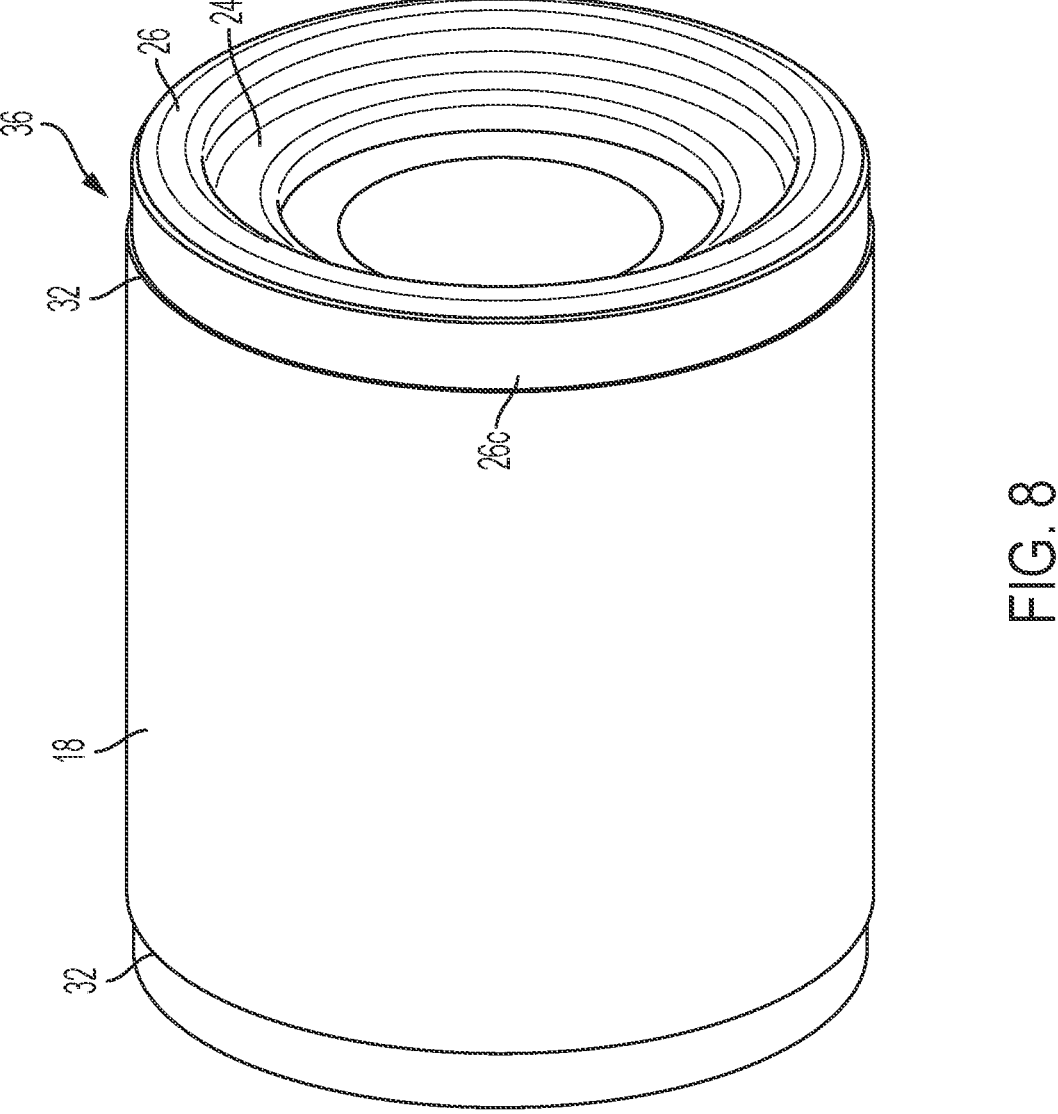
FIG. 8 shows annular surfaces machined onto the end segments prior to the metal rings being added.

The method can further include machining an annular surface 36, as shown in FIG. 8, on the outer circumferential surface of each of the end segments 22 prior to the fixing the metal rings 28 on the end segments 22. Prior to the machining, the shoulder 32 does not exist and the outer circumferential surface of the end segments has substantially constant diameter, as shown with the segments 22 in FIG. 5. The machining forms shoulder 32, which the metal ring 28 can abut to axially align the metal ring 28 on the respective segment 22.

After the machining of annular surface 36 to create shoulder 32, each metal ring 28 can be axially slid onto the respective segment 22 into axial contact with radially extending surface 32a of shoulder 32, and then the metal rings 28 can be fixed on the outer circumferential surface 26c of the respective end segment by shrink-fitting each of the metal rings on the respective end segments 22.

The method can then include measuring a mass imbalance of the rotor 14, and machining balancing holes 30 into the protrusion 26 to balance the rotor 14.

REFERENCE NUMERALS

10 motor
12 stator
14 rotor
16 rotor shaft
17 center axis
18 magnetic metal core
18a outer circumferential surface
18b inner circumferential surface
18c holes
18d ends
18e second axial end
18f surface
18g circumferentially spaced segments
19 electrically conductive metal
20 rotor bars
20a inner circumferential surfaces
22 end segments
24 base section
24a axially facing radially extending surface
24b inner circumferential surface
26 protrusion
26a axially facing radially extending surface
26b inner circumferential surface
26c outer circumferential surface
28 metal ring
28a inner circumferential surface
28b outer circumferential surface
28c surfaces
28d surfaces
30 balancing holes
32 shoulder
32a radially extending surface
32b outer circumferential surface
34 mold
36 annular surface

What is claimed is:

1. An induction motor rotor comprising:
a magnetic metal core;
an electrically conductive metal contiguous with the magnetic metal core, the electrically conductive metal including rotor bars extending along the magnetic metal core and end segments formed onto opposite ends of the rotor bars, each of the end segments including a base section extending a first axial distance from the magnetic metal core and a protrusion extending a second axial distance from the magnetic metal core, the second axial distance being greater than the first axial distance; and
a metal ring positioned on an outer circumferential surface of each of the end segments to prevent the end segments from separating from the rotor bars,
each of the metal rings being positioned on only a portion of an outer circumferential surface of the base section and only a portion of an outer circumferential surface of the protrusion.

2. The induction motor rotor as recited in claim 1 wherein the electrically conductive metal includes at least 99% aluminum.

3. The induction motor rotor as recited in claim 1 wherein the induction motor rotor is a squirrel cage rotor.

4. The induction motor rotor as recited in claim 1 wherein the outer circumferential surface of each of the end segments includes a shoulder, each of the metal rings abutting a respective one of the shoulders.

5. The induction motor rotor as recited in claim 1 wherein the metal ring is non-magnetic.

6. The induction motor rotor as recited in claim 1 wherein the magnetic metal core includes a plurality of circumferentially spaced axially extending holes, the rotor bars being cast into the circumferentially spaced axially extending holes.

7. The induction motor rotor as recited in claim 1 wherein the metal rings are each on an outer circumferential surface of a respective one of the protrusions.

8. The induction motor rotor as recited in claim 1 wherein a portion of each of the end segments extends radially inward of the rotor bars.

9. The induction motor rotor as recited in claim 8 wherein the portion of each of the end segments extending radially inward of the rotor bars is part of the base section.

10. The induction motor rotor as recited in claim 1 wherein the metal rings are formed of non-magnetic steel.

11. The induction motor rotor as recited in claim 1 wherein the metal rings have a higher yield strength than the end segments.

12. The induction motor rotor as recited in claim 1 wherein at least one of the protrusions includes at least one axially extending balancing hole formed therein.

13. An induction motor comprising:

a stator; and a rotor rotatable with respect to the stator, the rotor comprising:

a magnetic metal core formed by a plurality of circumferentially spaced segments;

an electrically conductive metal including rotor bars interleaved between the circumferentially spaced segments and end segments formed onto opposite ends of the rotor bars, each of the end segments protruding axially past the magnetic metal core and including a base section extending a first axial distance from the magnetic metal core and a protrusion extending a second axial distance from the magnetic metal core, the second axial distance being greater than the first axial distance; and a metal ring positioned on an outer circumferential surface of each of the end segments, the metal ring having a greater yield strength than the end segments, each of the metal rings being positioned on only a portion of an outer circumferential surface of the base section and only a portion of the outer circumferential surface of the protrusion.

14. A method of manufacturing an induction motor rotor comprising:

joining an electrically conductive metal to a magnetic metal core to form rotor bars interleaved between circumferentially spaced segments of the magnetic metal core and end segments formed onto opposite ends of the rotor bars, each of the end segments protruding axially past the magnetic metal core and including a base section extending a first axial distance from the magnetic metal core and a protrusion extending a second axial distance from the magnetic metal core, the second axial distance being greater than the first axial distance; and fixing a metal ring on an outer circumferential surface of each of the end segments, the metal rings each having a greater yield strength than the end segments, each of the metal rings being positioned on only a portion of an outer circumferential surface of the base section and only a portion of an outer circumferential surface of the protrusion.

15. The method as recited in claim 14 wherein the joining of the electrically conductive metal to the magnetic metal core includes:

positioning a plurality of magnetic segments circumferentially spaced apart from each other into a mold; and casting an electrically conductive metal into a mold to form the rotor bars interleaved between the circumferentially spaced segments and the end segments formed onto opposite ends of the rotor bars.

16. The method as recited in claim 14 further comprising machining an annular surface on the outer circumferential surface of each of the end segments, the metal rings each being fixed on one of the annular surfaces.

17. The method as recited in claim 14 further comprising machining balancing holes into the protrusion to balance the rotor.

18. The method as recited in claim 14 wherein the electrically conductive metal is formed of aluminum.

19. The method as recited in claim 14 wherein the metal ring is formed of a non-magnetic metal.

20. The method as recited in claim 14 wherein the fixing of the metal rings on the outer circumferential surface of end segments includes shrink-fitting each of the metal rings on a respective one of the end segments.

\* \* \* \* \*